(12) United States Patent
Hobbs (10) Patent No.: US 8,631,604 B2
(45) Date of Patent: Jan. 21, 2014

(54) APPARATUS AND METHODS FOR THE ILLUMINATION OF FISHING RODS

(76) Inventor: Wayne Owen Hobbs, Hesperia, CA (US)

(*) Notice: Subject to any disclaimer, the term of this patent is extended or adjusted under 35 U.S.C. 154(b) by 268 days.

(21) Appl. No.: 12/780,929

(22) Filed: May 17, 2010

(65) Prior Publication Data

US 2011/0013386 A1     Jan. 20, 2011

Related U.S. Application Data

(60) Provisional application No. 61/178,983, filed on May 17, 2009.

(51) Int. Cl.
    *A01K 75/02*          (2006.01)
    *A01K 85/00*          (2006.01)

(52) U.S. Cl.
    USPC ............. 43/17.5; 362/109; 43/4; 43/25

(58) Field of Classification Search
USPC ............. 43/4, 17, 17.5, 18.1 R, 25, 43.1; 362/109
See application file for complete search history.

(56) References Cited

U.S. PATENT DOCUMENTS

| | | | | |
|---|---|---|---|---|
| 4,117,618 A * | 10/1978 | Utsler | ............ | 43/17.5 |
| 5,179,797 A * | 1/1993 | Edwards et al. | ............ | 43/17.5 |
| 6,061,946 A * | 5/2000 | Toelken | ............ | 43/17.5 |
| 7,051,470 B2 * | 5/2006 | Lybarger et al. | ............ | 43/17.5 |
| 2006/0288629 A1 * | 12/2006 | Parker et al. | ............ | 43/17.5 |

* cited by examiner

*Primary Examiner* — Donald Raleigh
(74) *Attorney, Agent, or Firm* — J. Curtis Edmondson (57) ABSTRACT

A fishing light stringer system having: a multiplicity of lights, each light configurable to attach to a fishing rod eyelet, an electrical distribution system connected to the multiplicity of lights, wherein the electrical distribution system has a battery pack and wires, such that the electrical distribution system forms a complete circuit with the lights, so that when the electrical distribution system is connected to the multiplicity of lights and the multiplicity of lights are attached to the fishing rod eyelets, each eyelet is illuminated.

7 Claims, 8 Drawing Sheets

APPARATUS AND METHODS FOR THE ILLUMINATION OF FISHING RODS

PRIORITY

The present inventive subject matter claims the priority of Provisional Patent Application 61/178,983 submitted Mar. 17, 2009, the contents of which are incorporated herein by reference.

BACKGROUND

The present inventive subject matter relates to apparatus and methods for the illumination of the eyelets of fishing rods.

U.S. Pat. No. 6,789,348 issued on Sep. 14, 2004 to Kneller, et. al describes a fishing rod with a lighting element on the end of the rod. The figures in this patent do not depict illumination of the individual eyes on the rod.

U.S. Pat. No. 5,586,403 issued on Dec. 24, 1996 to Ward describes a fishing rod with a lighting elements along the length of the rod. The figures in this patent do not depict illumination of the individual eyes on the rod.

U.S. Pat. No. 4,117,618 issued on Oct. 3, 1978, to Ulster describes a fishing rod with a lighting elements also along the length of the rod. The figures in this patent do not depict illumination of the individual eyes on the rod.

Therefore it is an object of the inventive subject matter to provide a light stringer with a battery pack that can be attached to any fish rod to illuminate the eyelets of the fishing rod.

Therefore it is the object of the inventive subject matter to provide a light stringer with a battery pack with color variation that can be attached to the eyelets of any fishing pole.

SUMMARY

The present inventive subject matter overcomes problems in the prior art by having in the preferred embodiment a fishing light stringer system having a multiplicity of lights, each light configurable to attach to a fishing rod eyelet, a electrical distribution system connected to the multiplicity of lights, wherein the electrical distribution system has a battery pack and wires, such that the electrical distribution system forms a complete circuit with the lights, so that when the electrical distribution system is connected to the multiplicity of lights and the multiplicity of lights are attached to the fishing rod eyelets, each eyelet is illuminated. The fishing light stringer system wherein each light is a light emitting diode (L.E.D.). The fishing light stringer system wherein the multiplicity of lights further has the number of lights is selected from a group consisting of 4 lights, 5 lights, 6 lights, 7 lights, 8 lights, and 10 lights. The fishing light stringer system as further having a battery pack, the battery pack selected from a group comprising 18 volts, 24 volts, and 30 volts. The fishing light stringer system as in claim 1 wherein the lights further having one of the lights illuminated in red; one of the lights illuminated in white; and one of the lights illuminated in blue; such that the lights ornamentally project the colors of the American flag.

A method for illuminating eyelets on fishing rods, said method selecting a multiplicity of lights matching one or more lights to an eyelet wiring the lights in series, connecting the lights to a battery pack, so that when the electrical circuit is completed, the lights are illuminated on or near each eyelet.

These and other embodiments are described in more detail in the following detailed descriptions and the figures.

The foregoing is not intended to be an exhaustive list of embodiments and features of the present inventive subject matter. Persons skilled in the art are capable of appreciating other embodiments and features from the following detailed description in conjunction with the drawings.

REFERENCE CHARACTERS

110—Fishing Rod
120—Reel
130—Line
140—Grip

DETAILED DESCRIPTION

Representative embodiments according to the inventive subject matter are shown in FIGS. 1-8 wherein similar features share common reference numerals. Now referring to FIG. 1 which depicts the preferred embodiment of the inventive subject matter. A typical fishing pole 100 has a grip 140, a reel 120, line 130A, 130B, a rod 110. The line 130A,130B is fed by the reel 120, through the eyelets, and into the water 160.

Figure 1:
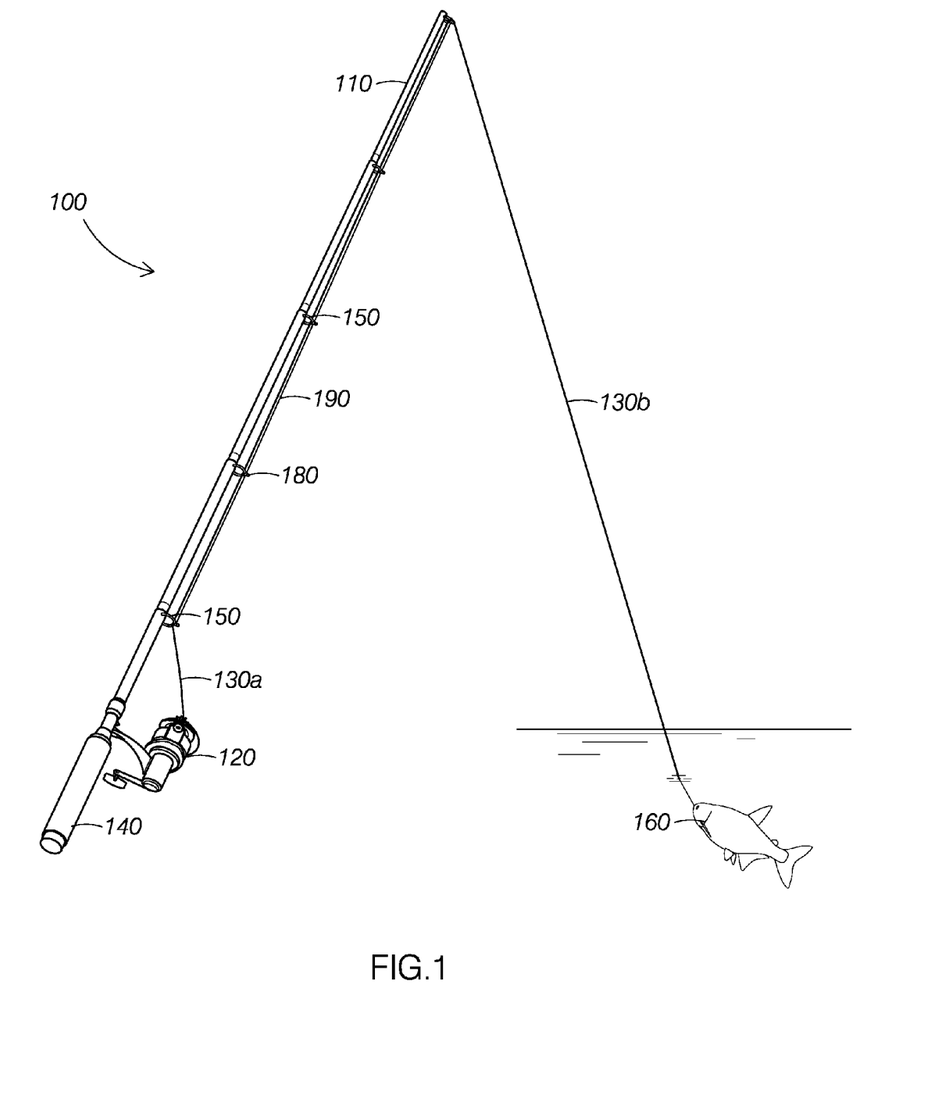
FIG. 1 is a diagram of the light stringers with the battery packs.

An embodiment of the inventive subject matter provides for the attachment of a light stringer connect to the fishing pole 100. The light stringer consists of a battery pack 170, conductive wire 190, and lights 180. In one configuration of the light stringer, the battery pack 170 is attached to the grip 140, and the lights 180 are attached to the eyelets 150.

Figure 2:
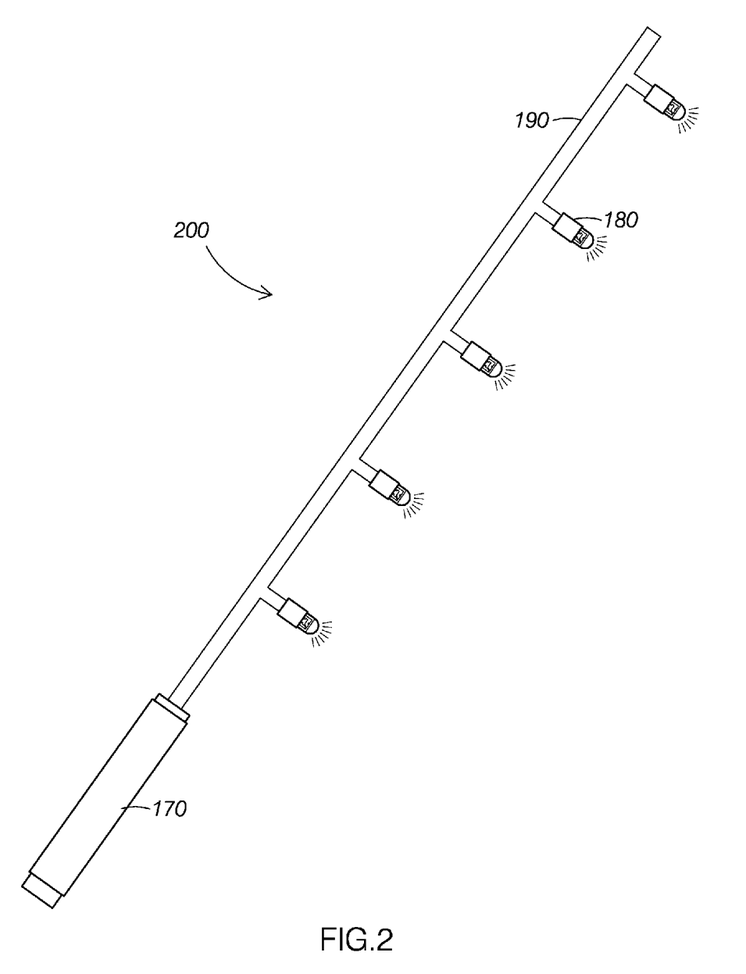
FIG. 2 is a diagram of the alternative embodiment of the light stringer with red, white, and blue lights (aka Patriot lights).

Now referring to FIG. 2 which depicts the light stringer 200 separated from the fishing pole 100. As noted the light stringer consists of a battery pack 170, conductive wire 190, and lights 180. Those skilled in the arts will recognize that the electrical wire forms a complete circuit from the battery pack 170, through the conductive wire 190, and passing current through the lights 180.

Figure 3:
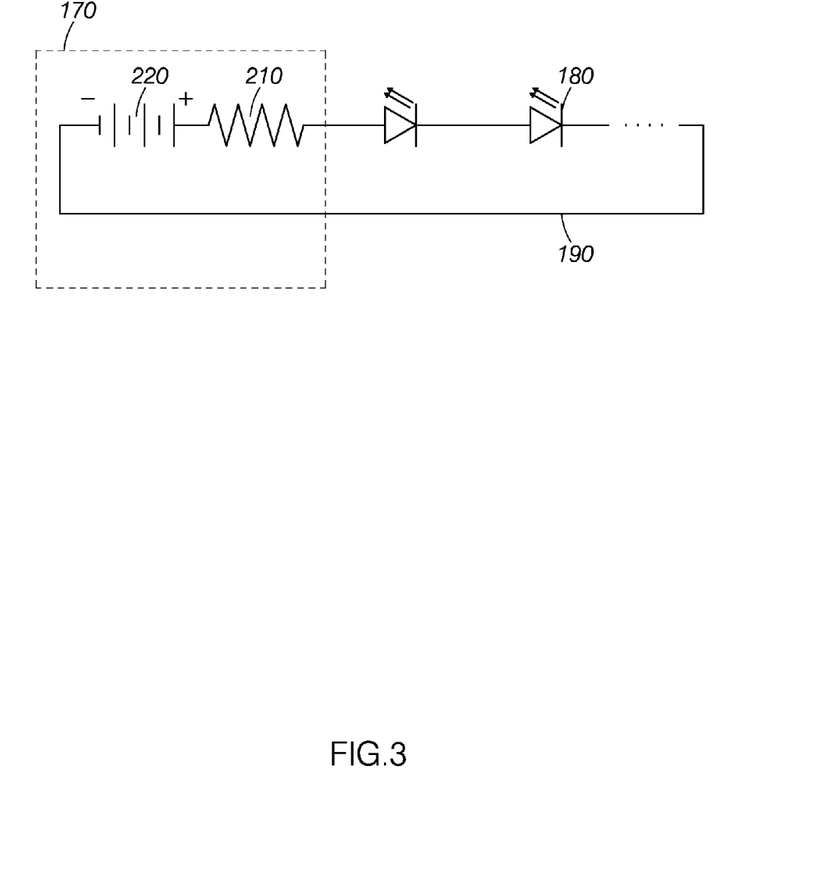
FIG. 3 is a diagram of the alternate embodiment of the clear blue and white stringers.

Now referring to FIG. 3 which depicts a schematic for the light stringer 200. The electrical operation of the light stringer involves a battery 220, an optional current limiting resistor, a light 180, and conductive wire 190. Those skilled in the arts will recognize that the lights 180 can be light emitting diodes, incandescent lamps, or other illumination technologies (such as fluorescent and/.or halogen lamps).

Although numerous configurations exist involving the arrangement of L.E.D's, batteries, and wire; the following are representative examples as shown in Table 1:

TABLE 1

| Configuration | Battery Pack | Lights |
|---|---|---|
| 1. | 18 V | 5-6 LED's in series |
| 2. | 24 V | 7-8 LED's in series |
| 3. | 30 V | 10 LED's in series |

As noted the lights 180 may be affixed to each of the individual eyelets 150 on the fishing rod in a 1 to 1 configuration. Furthermore the Lights may be configured as one color, or as alternating colors, such as RED-YELLOW-GREEN.

An alternative ornamental configuration involving the alternating colors for the lights in the configuration of RED-WHITE-BLUE. This alternative embodiment of the ornamental configuration (e.g. specific colors on the eyelets) may be done such that there are more RED lights than WHITE or BLUE lights.

Other configurations exist as shown in Table 2.

TABLE 2

| Configuration | Battery Pack | Lights | LED Voltage |
|---|---|---|---|
| 4. | 24 V | 7 LED's | 3.6 v |
| 5. | 18 V | 5 LED's | 3.6 v |
| 6. | 24 V | 5 LED's | 4.5 v or 3.7 v (Blue) |
| 7. | 30 V | 6 LED's | 4.5 v or 3.7 v |

Further ornamental configurations existing that depict different configurations for the stringers. For example, one configuration may have a 5, 6, and 8 light 180 light stringer with alternating blue and clear lights. FIG. 4B shows a multi-color light stringer of 6, 8, and 10 lights with red and yellow, yellow and green, and red and green. FIG. 4C shows plans for multi-color stringers of 5, 6, and 8 lights with the configurations of red and blue, yellow and blue, green and blue, red and clear, yellow and clear, and green and clear.

Further alternate battery pack configurations exists and may be implemented by those with skill in the electrical arts. By assembling a certain number of batteries in series the proper voltage may be obtained. In the case where an individual battery is 1.5V, then TABLE 3 depicts the configurations needed to obtain a specific voltage:

TABLE 3

| Configuration | Voltage | # Packs | # 1.5 Volt Batteries |
|---|---|---|---|
| 1. | 18 V | 1.5 | 12 Batteries |
| 2. | 24 V | 2.0 | 16 Batteries |
| 3. | 30 V | 2.5 | 20 Batteries |

Although the installation and configuration of batteries are well known to those in the electrical arts, a preferred embodiment has the battery packs assembled, encased in a rubber tubing, and the rubber tubing heat shrunk around the battery packs to provide resistance to the elements. Alternately the battery packs may be manufactured using an aluminum exterior shell with non-conductive contact points.

Figure 4:
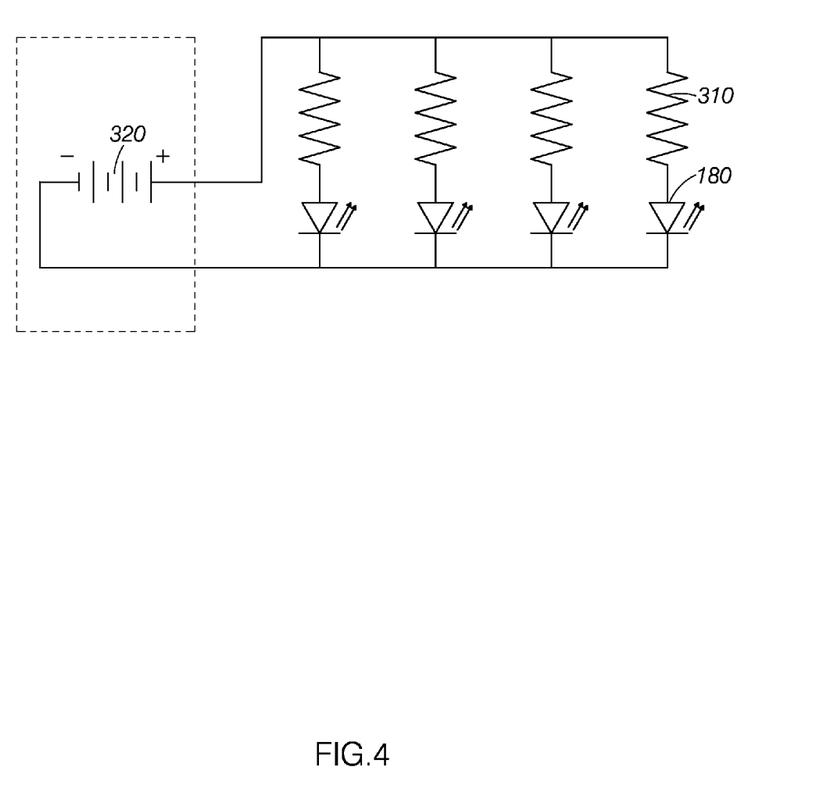
FIG. 4 is a schematic diagram of the alternate embodiment of the clear blue and white stringers.

Now referring to the schematic diagram as show on FIG. 4. This schematic is an alternate embodiment of the circuit as shown in FIG. 3. Here the lights 180 are placed in parallel with the battery pack 320. Current flows through the parallel current limiting resistors 310. Those skilled in the arts will recognize that a combination of parallel-series lamp circuits may also be used to produce the desired effect.

Figure 5:
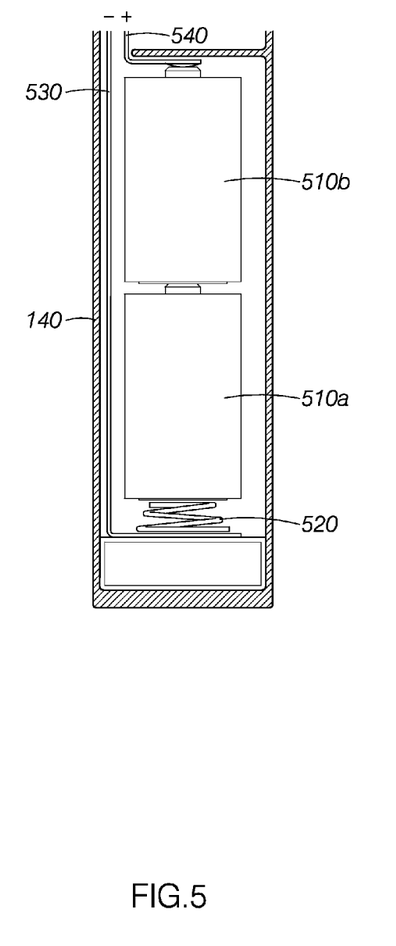
FIG. 5 is a diagram of the battery pack configurations

Now referring to FIG. 5 which shows an embodiment of the battery pack located inside the grip 140 of the fishing pole 100. This embodiment has the advantage that an external battery pack is not needed and the batteries may be inserted and removed a screw plug at the base of the grip. Those skill in the arts will recognize that this screw plug arrangement is used in flashlights.

Figure 6:
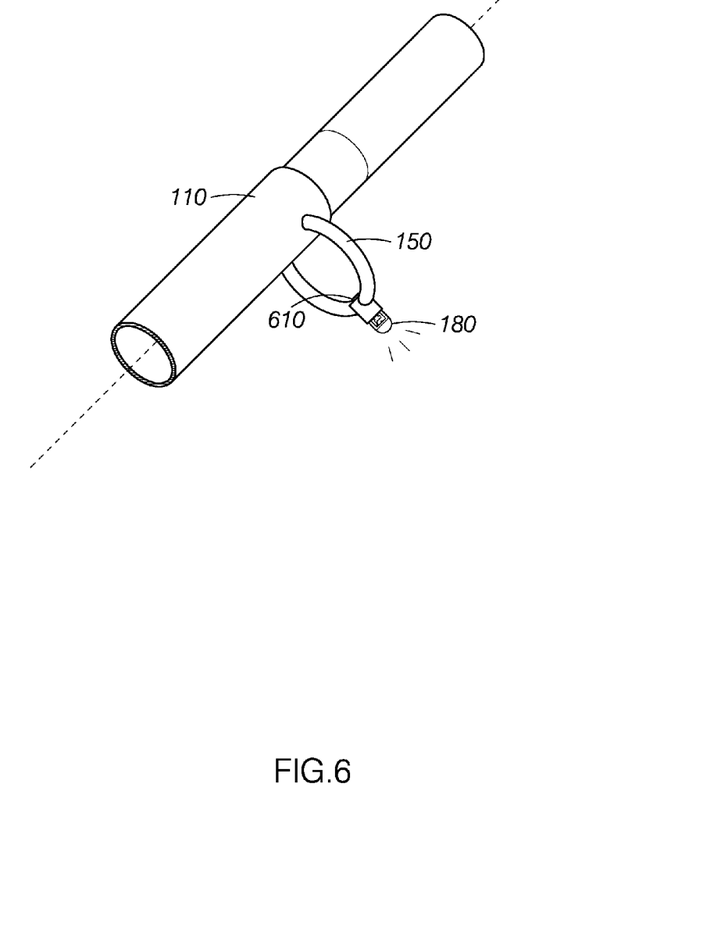
FIG. 6 are plans for a tube battery and supply and caps.

Now referring to FIG. 6 which shows an detailed view of the pole 110 and the eyelet 150. The light 180 is attached to the eyelet 150 in a manner that the light 180 does not become detached from the eyelet during normal use. Various types of attachments 610 may be used, including, but not limited to: mechanical metal clips, plastic clips, and/or fabric type clips, which may include hook and loop type connectors, such as, Velcro®.

Figure 7:
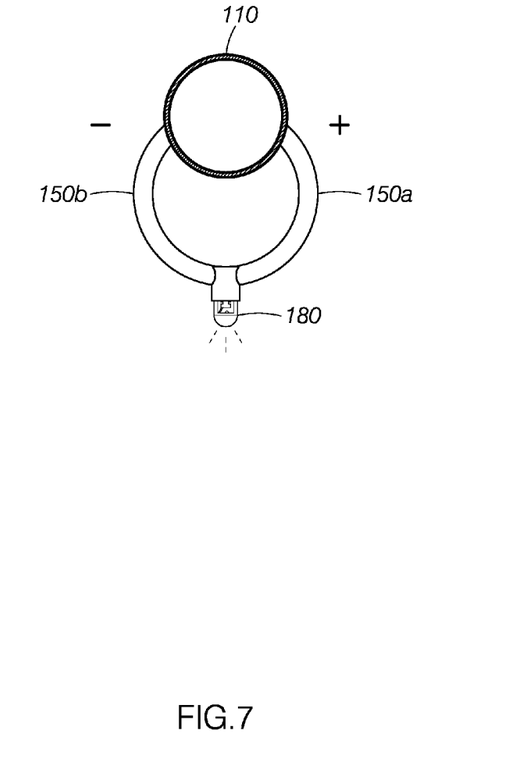
FIG. 7 is a diagram of an alternate embodiment of an eyelet-pole configuration.

Now referring to FIG. 7, which illustrates an alternate embodiment of an eyelet-pole configuration. In this embodiment, the eyelet 150 is bifurcated into two sections, 150A, and 150B, each side carrying current from and to the light. This provides for ease of attaching lights and a reduction in wiring to the light 180.

Figure 8:
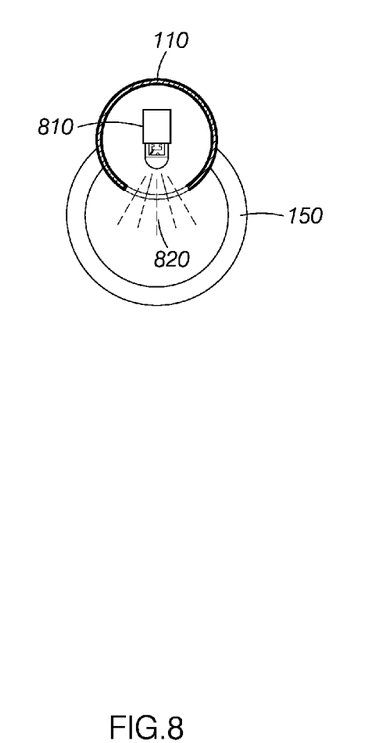
FIG. 8 is a diagram of an alternate embodiment of an eyelet-pole configuration.

Now referring to FIG. 8, which illustrates a further alternate embodiment of the pole-eyelet configuration. This configuration has the light 810 mounted inside the pole which is translucent. Light 820 is transmitted through the pole 110. This further reduces the need for exterior wiring. The lights may also be mounted either adjacent to and/or in-between the eyelets 150.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

I claim:

1. A fishing light stringer system for use with a fishing rod comprising:
   a multiplicity of lights, each light configurable to attach to an eyelet of the fishing rod;
   plural clips, the clips are removably attachable to the eyelets;
   an electrical distribution system connected to the multiplicity of lights, wherein the electrical distribution system has a battery pack and wires, such that the electrical distribution system forms a complete circuit with the lights;
   so that when the electrical distribution system is connected to the multiplicity of lights and the multiplicity of lights are attached to the fishing rod eyelets, the rod is illuminated;
   wherein, the battery pack is configured to generate 18 volts, 24 volts and 30 volts;
   wherein, the battery pack is operationally detachable from the rod.

2. The fishing light stringer system as in claim 1 wherein each light is a light emitting diode.

3. The fishing light stringer system as in claim 1 wherein the multiplicity of lights further comprises: the number of lights is selected from a group consisting of 4 lights, 5 lights, 6 lights, 7 lights, 8 lights, and 10 lights.

4. The fishing light stringer system as in claim 1 wherein the lights further comprise: one of the lights illuminated in red; one of the lights illuminated in white; one of the lights illuminated in blue; such that the lights ornamentally project the colors of the American flag.

5. A method for using a fishing light stringer system to illuminate fishing rods, said method comprising:
   selecting a multiplicity of lights,
   matching one or more lights to an eyelet of the rod,
   attaching the lights to the eyelets via mechanical metal clips, plastic clips, and fabric clips,
   wiring the lights in series,
   connecting the lights to a battery pack, so that when the electrical circuit is completed, the lights are illuminated on or near each eyelet wherein, the battery pack is configured to generate 18 volts, 24 volts and 30 volts; and,
   detaching the lights from the eyelets.

6. The fishing light stringer system as in claim 1 wherein the battery pack is configured to carry 12, 16 and 20 1.5 volt batteries in a series.

7. The fishing light stinger system as in claim 1 wherein the plural clips are mechanical metal clips, plastic clips, and fabric clips.

* * * * *